_United States Patent Office_

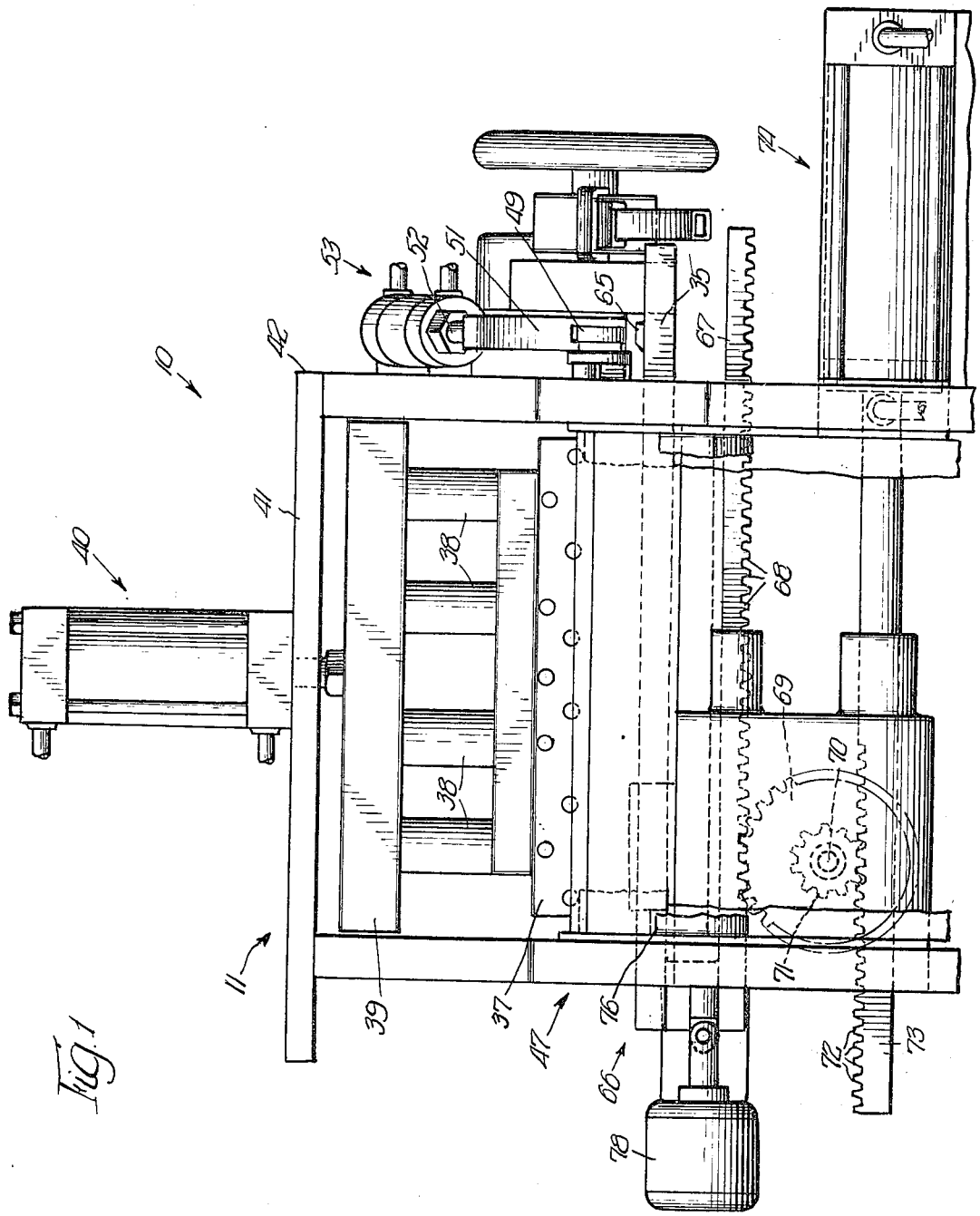

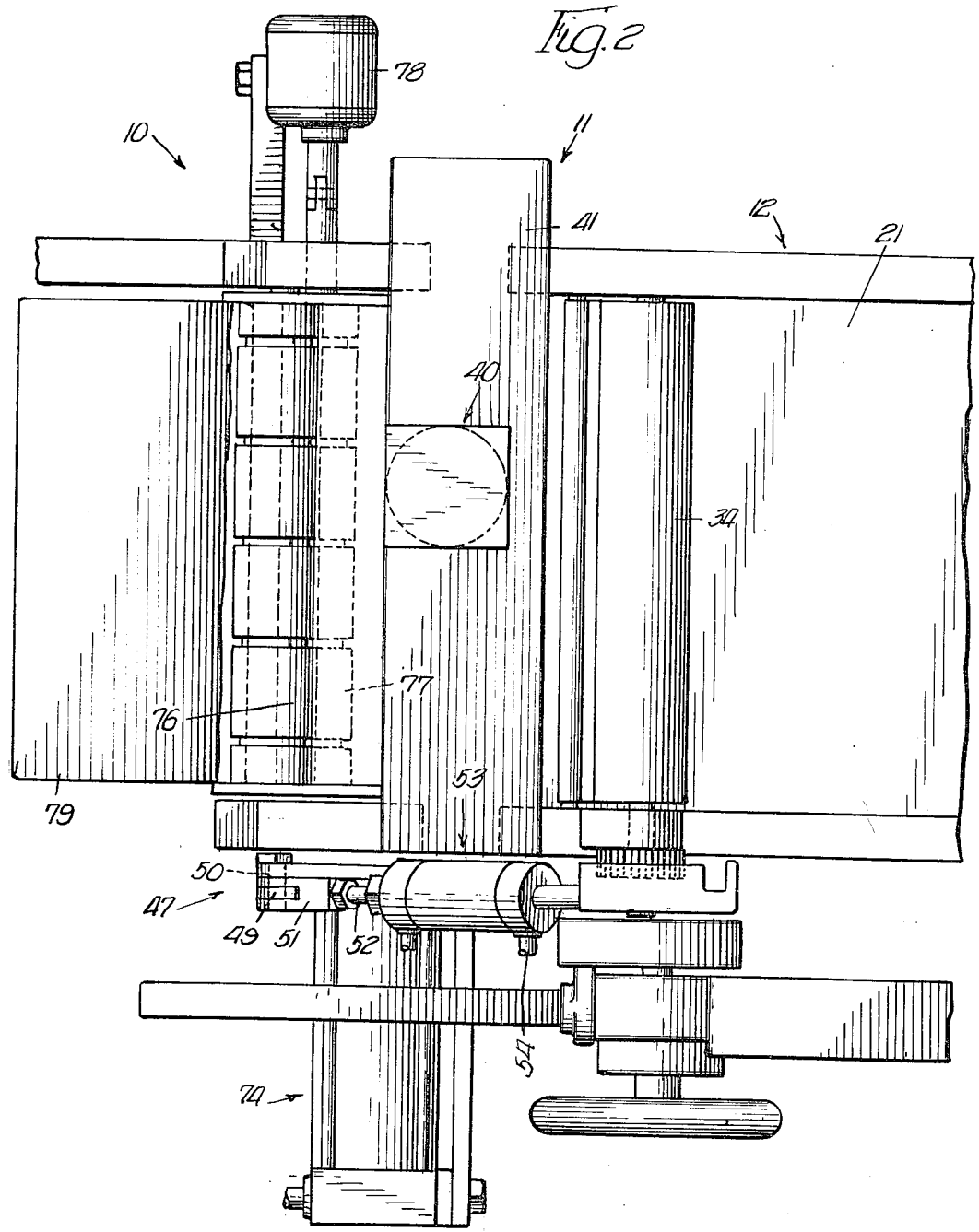

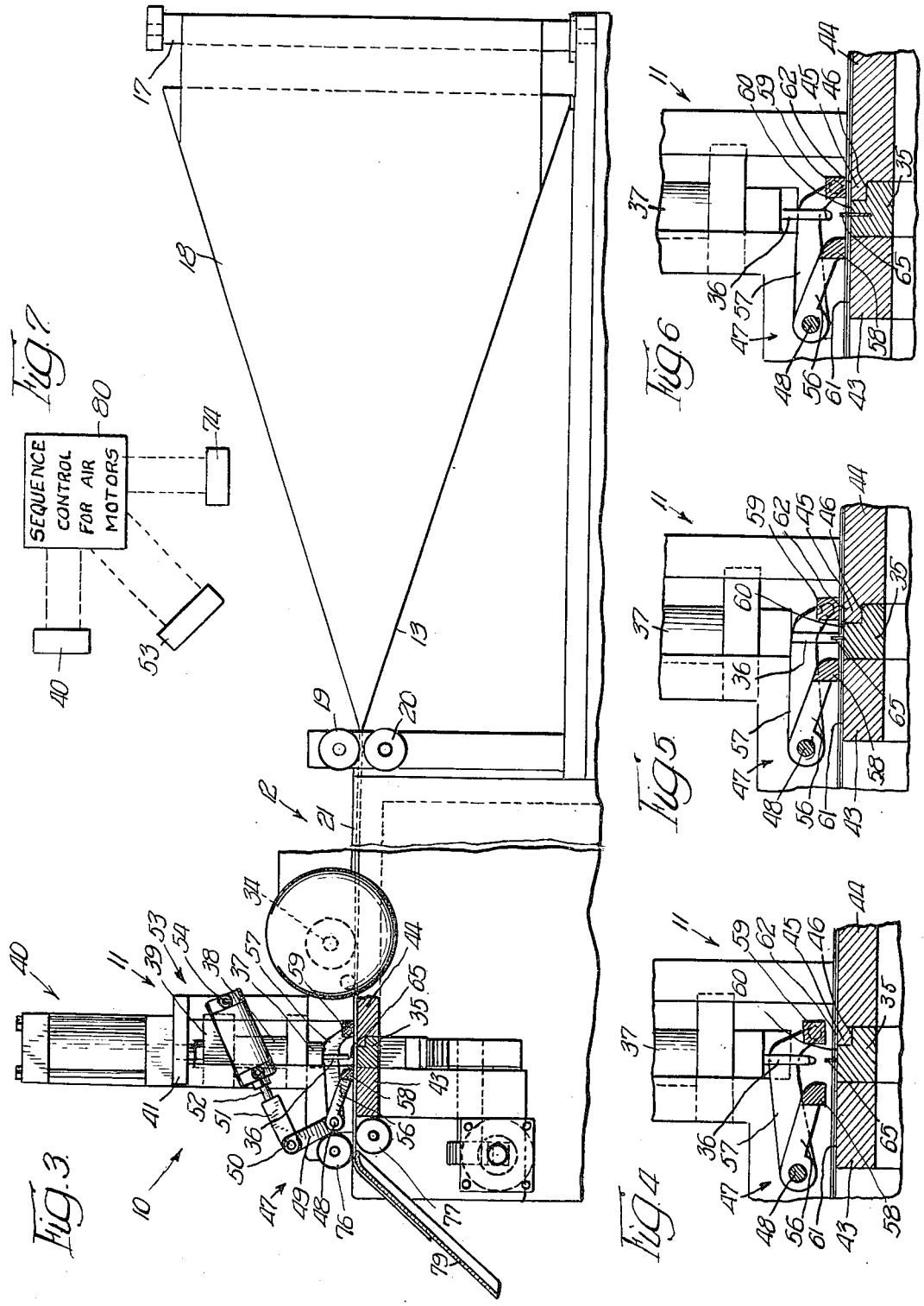

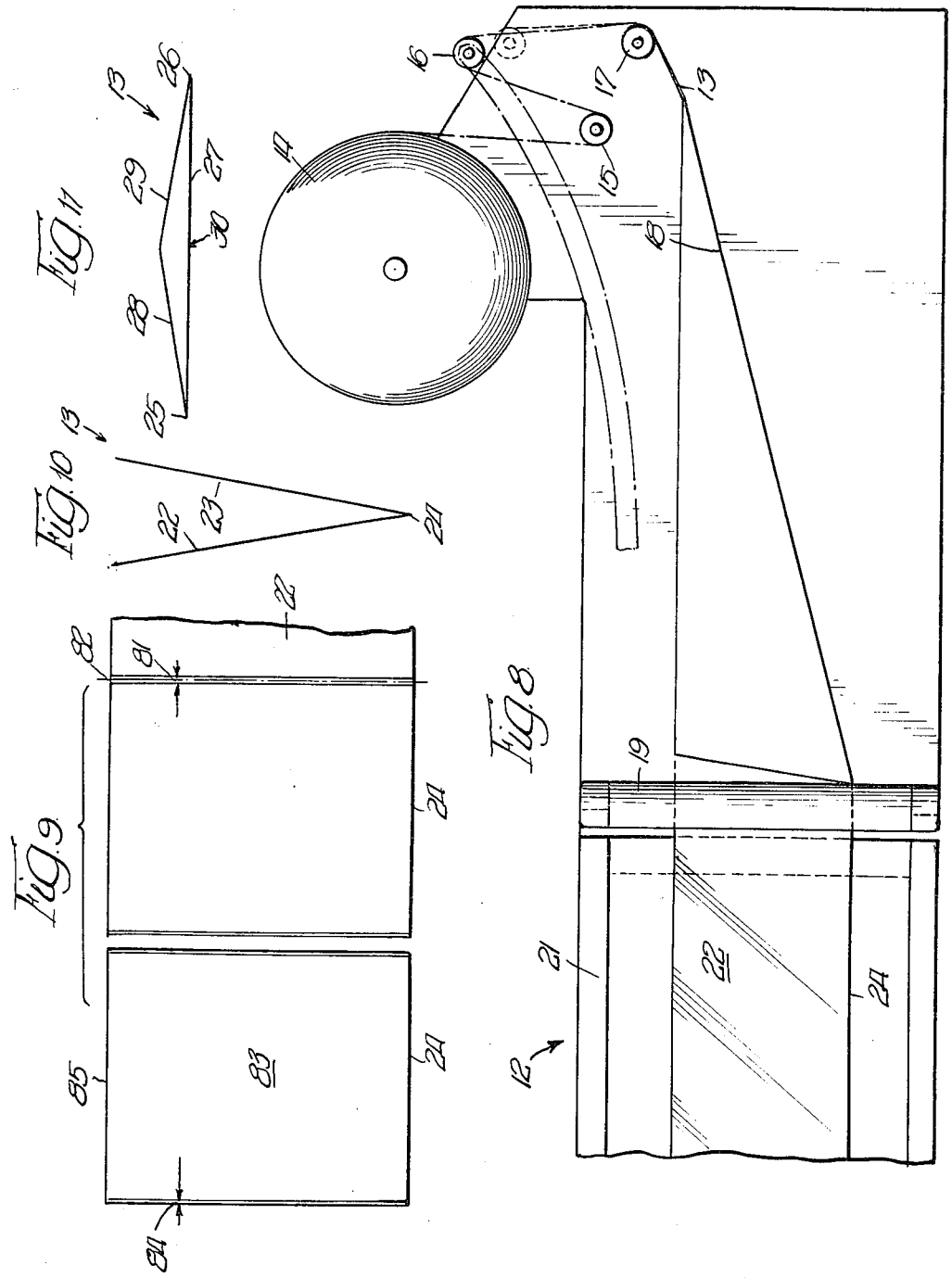

3,493,456
Patented Feb. 3, 1970

3,493,456
METHOD OF AND APPARATUS FOR SEALING OR WELDING THERMOPLASTIC FILMS AND SEVERING THEM ALONG THE SEAL OR WELD AREA
Leonard J. Vilutis, 517 E. 166th Place,
South Holland, Ill. 60473
Filed July 6, 1966, Ser. No. 563,220
Int. Cl. B30b *15/34;* B32b *31/00*
U.S. Cl. 156—515               7 Claims

ABSTRACT OF THE DISCLOSURE

According to this invention the film is fed in stepwise fashion to a sealing or welding station where the film is clamped and stretched or tensioned with respect to one of a pair of heat sealing jaws or to one of a pair of high frequency electrodes. Next the other heat sealing jaw or high frequency electrode is moved to engage the film under pressure and, while the pressure is maintained, energy is applied to seal or weld the juxtaposed plies of the film along a limited area. Then the other heat sealing jaw or high frequency electrode is removed and, while the clamping and stretching or tensioning action is maintained, the one heat sealing jaw or high frequency electrode is moved lengthwise of the sealed or welded area together with a knife blade so positioned as to split the sealed or welded area in halves. The clamping action is then released, the sealed and cut film is discharged, and the foregoing steps are repeated.

---

This invention relates, generally, to the manufacture of bags or pouches and it has particular relation to the sealing or welding of thermoplastic films and severing the same to form the bags or pouches.

Bags or pouches of thermoplastic film have been manufactured from a single web folded lengthwise and crossed sealed or welded at spaced locations. Also two webs have been employed and provision made for sealing or welding them along a third side. The fourth side is left open for filling and subsequent sealing or welding. The cross seals or welds are relatively wide. For example, they may be of the order of ¾″ in width and are subsequently cut or severed intermediate the edges of the sealed or welded area to form the individual bags or pouches. A reason for the relatively wide sealed or welded area is to insure that the cutting or severing action is performed well within the sealed or welded area to insure that the necessary fluid tight integrity of the bag or pouch is maintained. The cutting or severing action is accomplished at a different location from the location where the sealing or welding operation is performed and usually is accomplished by the use of a photoelectric control. In such an arrangement substantial tolerance must be provided for because of film stretching, variation in machine operation, etc. Substantial waste of film results from the provision of the relatively wide sealed or welded area since, insofar as the fluid tight integrity of the bag or pouch is concerned, the width of the sealed or welded area can be relatively narrow. However, since the cutting or severing operation is carried out at a different location from the sealing or welding station, it is necessary to provide a relatively wide sealed or welded area in order to make certain that the severing operation is performed well within it.

Among the objects of this invention are: To reduce substantially the width of the sealed or welded area that is required along opposite edges of overlying thermoplastic films where the cutting or severing operation is performed to fabricate separate bags or pouches; to seal or weld the films together along a narrow area of the order of ½₂″ in width and to cut or sever this sealed or welded area substantially in halves; and to feed the thermoplastic film to the sealing or welding station and, while at this station or at least a part of it, to perform the cutting or severing operation after the seal or weld has been made.

In the drawings: FIG. 1 is a view, in front elevation, of a machine for welding or severing overlying plastic films, the discharge rollers and inclined discharge apron having been omitted. FIG. 2 is a top plan view of the machine shown in FIG. 1. FIG. 3 is a view, in side elevation, certain parts being shown in section, of the machine shown in FIGS. 1 and 2. FIGS. 4, 5 and 6 are views, partly in side elevation and partly in section and at an enlarged scale, of a portion of the sealing or welding station of the machine illustrated in FIGS. 1, 2 and 3 to show different steps in the operation of the machine. FIG. 7 shows diagrammatically the control system for the air motors. FIG. 8 is a top plan view of the film feeding end of the machine shown in FIGS. 1, 2 and 3. FIG. 9 is a top plan view of the film and shows how it is folded, welded and cut to form individual bags or pouches. FIG. 10 is a view, in end elevation, of the films shown in FIG. 9 and illustrates how they are folded along a fold line. FIG. 11 is a view, similar to FIG. 10, and shows an alternate folding arrangement for the film.

In FIGS. 1, 2 and 3 the reference character 10 designates, generally, a machine for welding or severing overlying plastic films embodying this invention. The machine 10 includes a sealing or welding station that is indicated, generally, at 11. Associated with the sealing or welding station 11 is a feeding mechanism that is indicated, generally, at 12. The feeding mechanism 12 is of conventional construction and is arranged to feed film 13 in a stepwise fashion to the sealing or welding station 11. For example, the feeding mechanism 12 may be of the kind and character manufactured by Simplex Packaging Machinery Division of Food Machinery and Chemical Co. of Oakland, Calif. However, other feeding mechanisms can be employed and, with suitable modification, instead of employing a stepwise feeding mechanism, the feeding mechanism can be arranged to operate continuously.

In FIG. 8 the film 13 is shown as being fed from a vertical roll 14 and is guided therefrom by guide rollers 15, 16 and 17 to pass over a triangle board 18 by means of which it is folded to move between stationary cylindrical guides 19 and 20, FIG. 3, onto a bed 21 of the feeding mechanism 12. The film 13 is of the heat sealable type where heated members are employed for performing the sealing operation. Where high frequency welding is used, the film is selected to have a relatively high dielectric constant. The present invention is described in connection with the use of high frequency welding equipment. However, it will be understood that heat sealing means can be employed with suitable modification.

As illustrated in FIG. 10, using the triangle board 18, the film 13 is folded to form overlying film sections 22 and 23 of equal width along a longitudinal fold line 24. The illustration here shows the relationship of the overlying film sections 22 and 23 as they leave the triangle board 18 and enter between the stationary cylindrical guides 19 and 20.

FIG. 11 shows an alternate configuration for the film 13. Here, instead of feeding the film from a vertical roll 14, it is fed from a horizontal roll and is longitudinally folded at 25 and 26 to form a bottom portion 27 and overlying film sections 28 and 29 of equal width and of a total length equaling the length of the bottom portion 27. Subsequently, after the sealing and severing operations have been completed, the bottom portion 27 is slit lengthwise as indicated at 30 thereby forming two individual bags or pouches. Using the configuration shown either in FIG. 10 or in FIG. 11, the same sealing or welding and severing operations as disclosed herein are employed for forming the individual bags or pouches.

The folded film 13 is fed over the bed 21 of the feeding machine 12 in a stepwise fashion by feed rollers one of which is shown at 34 in FIG. 2. The folded film 13 is fed over a lower electrode 35, FIGS. 3–6, which is suitably connected to one terminal of a high frequency generator. The other terminal of the high frequency generator is connected to an upper electrode 36 which is relatively narrow and has a thickness of the order of $\frac{1}{8}''$ tapering to a width of $\frac{1}{64}''$ at the lower end for engaging the upper surface of the upper film section 22 for welding the same to the underlying section 23. Suitable control means, not shown, are provided for controlling the application of high frequency energy to the electrodes 35 and 36 to perform the welding operation in proper timed sequence to the other operations.

The upper electrode 36 depends from an electrode support 37 which, in turn, is carried by insulators 38 depending from a vertically reciprocable horizontal bar 39. For moving the horizontal bar 39 vertically downwardly and upwardly to bring the upper electrode 36 into welding position an air motor, shown generally at 40, of the piston type is employed. The air motor 40 is stationarily mounted on a top cross member 41 of a frame 42 which forms a part of the sealing or welding station 11.

In FIGS. 3–6 the lower electrode 35 is illustrated as being positioned between guides 43 and 44. The lower electrode 35 is arranged to be moved longitudinally between the guides 43 and 44. It is held in position therebetween and also by a flange 45, extending from the guide 44, which interfits with a recess 46 in the lower electrode 35. The arrangement for longitudinally moving the lower electrode 35 will be described presently.

In order to clamp that portion of the folded film 13 at the sealing or welding station 11 on opposite sides of the lower electrode 35 there is provided clamp mechanism that is indicated, generally, at 47. The clamp mechanism 47 includes a horizontal shaft 48 that is suitably journaled at its ends. An arm 49 is secured to the shaft 48 and is pivotally connected at 50 to a clevis 51 which is located at the outer end of a piston rod 52 which extends from an air motor, shown generally at 53, which is pivotally mounted at 54 on the frame 42. Also secured to the shaft 48 for rotation therewith are clamp arms 56 and 57 which have longitudinally extending foot members 58 and 59 at their distal ends. The arrangement is such that, when the air motor 53 is suitably energized, the shaft 48 is rotated to swing the clamp arms 56 and 57 from their positions as shown in FIG. 4 to their positions as shown in FIG. 5. Here the overlying film sections 22 and 23 to be welded and severed are clamped and stretched or tensioned. The stretching or tensioning action is accentuated by locating the surface 60 of the lower electrode 35 at a slightly higher elevation than the elevation of the surfaces 61 and 62 of the guides 43 and 44. Since the foot members 58 and 59 overlie the surfaces 61 and 62, when they are moved into clamping engagement with the overlying film sections 22 and 23, they stretch or tension the portion of the film therebetween over the slightly elevated surface 60 of the lower electrode 35.

In accordance with this invention, instead of moving the section of the film 13 away from the sealing or welding station 11 and then performing the severing operation, provision is made for performing the severing operation while the overlying film sections 22 and 23 remain at the sealing or welding station 11 and clamped by the clamp mechanism 47 to the guides 43 and 44. It is for this purpose that provision is made for moving the lower electrode 35 lengthwise. Also a knife 65 is mounted at one end of the lower electrode 35. Preferably the knife 65 is of razor blade thickness and is aligned centrally with the upper electrode 36 or more particularly is aligned centrally with the welded area that is formed as the result of application of high frequency energy between the electrodes 35 and 36.

As shown in FIG. 1 the lower electrode 35 forms one arm of a horizontally reciprocable yoke that is indicated, generally, at 66. The other arm 67 of the yoke 66 is provided with downwardly directed rack teeth 68 that are arranged to be engaged by the teeth of a relatively large diameter gear 69 which is arranged to rotate about a stationary horizontal axis 70. Rotatable with the gear 69 is a pinion 71 the teeth of which engage rack teeth 72 that face upwardly on a piston rod 73 which extends from an air motor that is indicated, generally, at 74. Since the diameter of the pinion 71 is substantially smaller than the diameter of the gear 69, a relatively small translatory movement of the piston rod 73 is reflected in a relatively great movement of the yoke 66 and thereby of the lower electrode 35 together with the knife 65.

After the severing operation has been performed the completed bag or pouch is moved between discharge rollers 76 and 77, the former being driven by an electric motor 78. The completed bag or pouch are discharged over an inclined apron 79 into a suitable receptacle.

FIG. 7 shows diagrammatically the control for the air motors 40, 53 and 74. They are arranged to be operated by opening and closing of air valves under the control of solenoids which are selectively energized by the opening and closing of control switches the operation of which is controlled by a suitable cam mechanism or other timing mechanism as may be desired.

The sequence of operation employing the mechanism disclosed herein is as follows. The overlying film sections 22 and 23 of the film 13 are fed to the sealing or welding station 11 in accordance with the width of the bag or pouch that is to be fabricated. The sequence control 80 then functions to energize air motor 53 and the clamp mechanism 47 is operated from the position shown in FIG. 4 to the position shown in FIG. 5. That portion of the overlying film sections 22 and 23 between the foot members 58 and 59 is stretched or tensioned over the lower electrode 35 and is clamped to guides 43 and 44. While the clamping action is maintained together with the stretching or tensioning action, the air motor 40 is energized to move the upper electrode 36 into engagement with the upper side of the film section 22 under pressure. At this time the electrodes 35 and 36 are energized with high frequency energy and the overlying film sections 22 and 23 are securely welded together in fluid tight relation. Thereafter the application of high frequency energy ceases and the air motor 40 is energized to move the upper electrode 36 to the uppermost position shown in FIG. 6. However, the clamp mechanism 47, as here shown, remains in position to clamp and stretch or tension the overlying sections 22 and 23 of the film 13.

While the overlying sections 22 and 23 of the film 13 remain in clamped and stretched or tensioned relation with respect to the lower electrode 35, the air motor 74 is energized to move the piston rod 73 from left to right, thereby causing counterclockwise rotation of the large diameter gear 69 and horizontal movement of the yoke 66 from right to left. The knife 65 then moves together with the lower electrode 35 to split the welded area in halves. Then the air motor 74 is reversed to return the knife 65 to its initial position.

The operation of the air motor 53 is reversed and the clamp mechanism 47 is returned to the unclamped position shown in FIG. 4. The section of the overlying films 22 and 23 which now form the completed bag or pouch is withdrawn by the discharge rollers 76 and 77.

In FIG. 9 the width of the sealed or welded area is indicated at 81. Preferably this is of the order of $\frac{1}{32}''$ wide in order to reduce to a minimum the extent of the plastic film 13 that is employed for sealing purposes. The longitudinal split formed by the knife 65 in the manner described is indicated at 82. The completed bag or pouch is indicated at 83 and at 84 is indicated the width of the sealed or welded area of the individual side seal which is of the order of $\frac{1}{64}''$. It has been found that this width of seal on opposite sides of the completed bag or pouch 83 is sufficient to provide the necessary fluid tight seal. One side of the completed bag or pouch 83 is folded as indicated at 24 so there are three closed sides. The fourth side 85 is open to permit insertion of whatever is to be enclosed in the bag or pouch 83.

What is claimed as new is:

1. In a machine for welding and severing overlying thermoplastic films, in combination
   a pair of sealing members for applying energy to said films therebetween to weld them together along a limited area,
   means mounting one of said sealing members for movement along said limited area,
   means on said one sealing member for severing said films intermediate the edges of said limited area, and
   means for holding said films stationary along opposite sides of said limited area while they are being severed.

2. The welding and severing machine according to claim 1 wherein said holding means includes means for clamping and tensioning said films along said opposite sides of said limited area.

3. The welding and severing machine according to claim 2 wherein said one sealing member is movable along said limited area after the sealing operation has been performed and while said films remain tensioned.

4. The welding and severing machine according to claim 3 wherein
   said sealed area has a width of about 1/32 inch,
   said severing means is a knife blade arranged to split said sealed area substantially in halves.

5. The welding and severing machine according to claim 1 wherein
   said sealed area has a width of about 1/32 inch,
   said severing means is a knife blade arranged to split said sealed area substantially in halves.

6. In a machine for welding and severing overlying thermoplastic films, in combination
   a pair of sealing members for applying energy to said films therebetween to weld them together along a limited area,
   means for holding said films stationary along opposite sides of said limited area,
   means for moving one of said sealing members toward and away from the other sealing member,
   means for moving said other sealing member along said limited area, and
   a knife blade on said other sealing member for severing said films intermediate the edges of said limited area after said one sealing member has been moved away from said other sealing member and while said other sealing member is moved along said limited area.

7. The welding and severing machine according to claim 6 wherein said holding means is arranged to tension said films along opposite sides of said limited area.

References Cited

UNITED STATES PATENTS

| 2,627,893 | 2/1953 | Williams | 156—583 |
| 2,999,532 | 9/1961 | Bursak | 156—583 |
| 3,047,991 | 8/1962 | Siegel et al. | 156—583 |
| 3,234,069 | 2/1966 | Saas | 156—515 |
| 3,234,072 | 2/1966 | Dreeben | 156—515 |

DOUGLAS J. DRUMMOND, Primary Examiner

U.S. Cl. X.R.

156—530, 583